United States Patent
Ferree, Jr.

(10) Patent No.: US 8,820,773 B2
(45) Date of Patent: Sep. 2, 2014

(54) CONVERTIBLE HAND TRUCK

(71) Applicant: Edwin Howard Ferree, Jr., Swannanoa, NC (US)

(72) Inventor: Edwin Howard Ferree, Jr., Swannanoa, NC (US)

( * ) Notice: Subject to any disclaimer, the term of this patent is extended or adjusted under 35 U.S.C. 154(b) by 0 days.

(21) Appl. No.: 13/671,457

(22) Filed: Nov. 7, 2012

(65) Prior Publication Data

US 2013/0127138 A1    May 23, 2013

Related U.S. Application Data

(60) Provisional application No. 61/557,180, filed on Nov. 8, 2011.

(51) Int. Cl.
  *B62B 1/00*  (2006.01)
  *B62B 3/02*  (2006.01)
  *B62B 3/10*  (2006.01)

(52) U.S. Cl.
  CPC . *B62B 3/02* (2013.01); *B62B 3/108* (2013.01); *B62B 2205/006* (2013.01); *B62B 2206/006* (2013.01); *B62B 2202/66* (2013.01)
  USPC ...................... 280/638; 280/47.27; 280/47.17

(58) Field of Classification Search
  USPC ........ 280/651, 30, 655, 654, 639, 638, 47.18, 280/47.2, 47.24, 47.27, 47.17
  See application file for complete search history.

(56) References Cited

U.S. PATENT DOCUMENTS

| | | | | |
|---|---|---|---|---|
| 3,064,989 | A  * | 11/1962 | Bellows | 280/641 |
| 4,921,270 | A  * | 5/1990 | Schoberg | 280/47.27 |
| 6,328,319 | B1 * | 12/2001 | Stahler, Sr. | 280/47.18 |
| 6,910,710 | B2 * | 6/2005 | Nguyen | 280/651 |
| 7,513,511 | B2 * | 4/2009 | Chaseateau | 280/47.27 |
| 7,854,444 | B2 * | 12/2010 | Zhuang | 280/651 |
| 8,070,181 | B2 * | 12/2011 | Forrest et al. | 280/651 |
| 8,100,430 | B2 * | 1/2012 | Meyers et al. | 280/651 |
| 8,505,959 | B2 * | 8/2013 | Darling, III | 280/651 |
| 2002/0105169 | A1 * | 8/2002 | Dahl | 280/651 |
| 2005/0006877 | A1 * | 1/2005 | Kachkovsky | 280/651 |
| 2010/0032927 | A1 * | 2/2010 | Gordon | 280/659 |

* cited by examiner

*Primary Examiner* — Hau Phan

(57) ABSTRACT

A convertible hand cart can be converted among a panel cart, a tray cart, a hotel cart, a utility cart, a mechanic's cart, a gardener's cart, and the like. The convertible hand cart can be used to transport items through doorways and through narrow halls. In addition to the ability to hall panels, the panel cart configuration has the ability to haul long lumber, doors, windows, mattresses and many other odd shaped items. The convertible hand cart has a removable, repositionable handle and a removable tongue to provide various configurations.

12 Claims, 15 Drawing Sheets

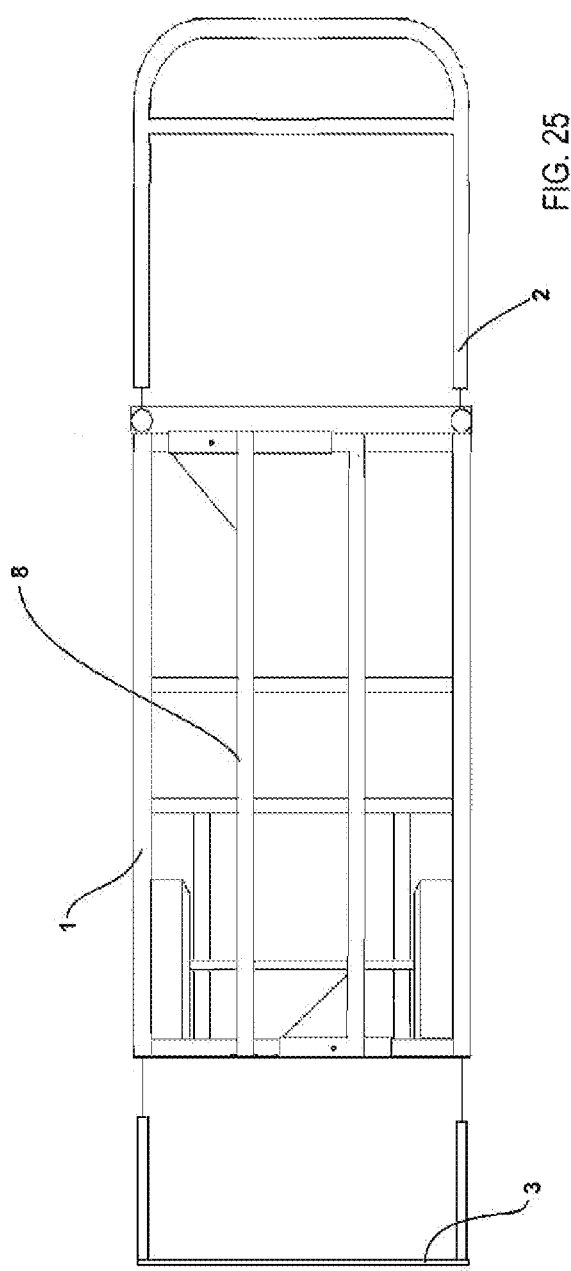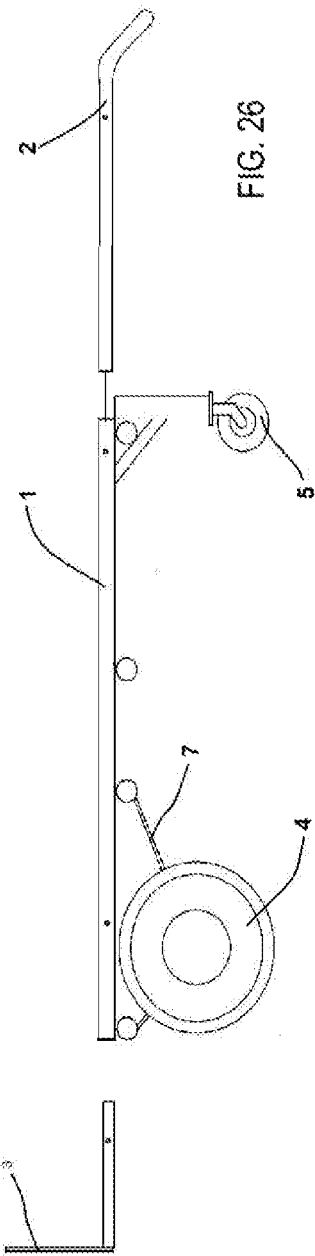

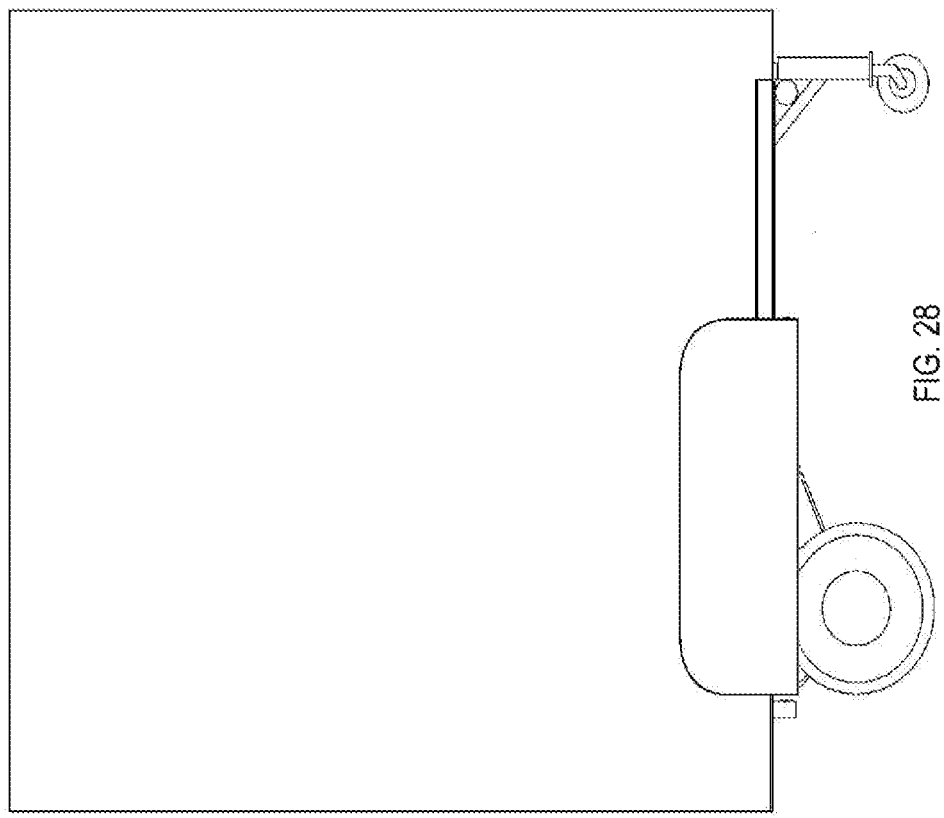
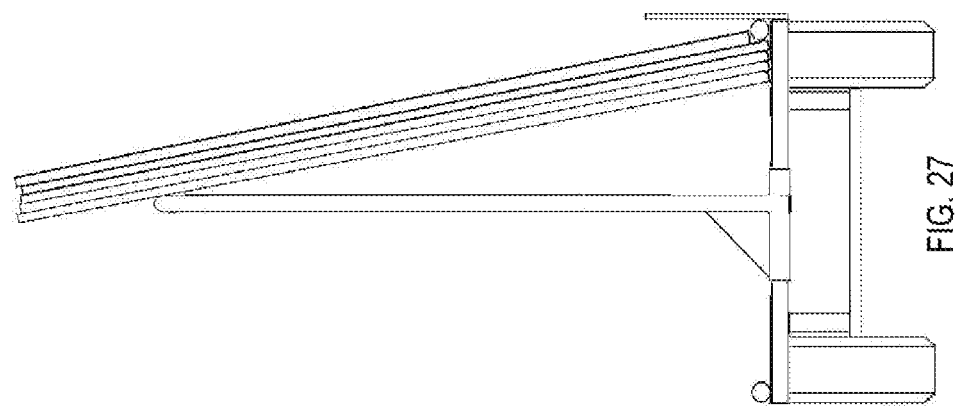

CONVERTIBLE HAND TRUCK

CROSS-REFERENCE TO RELATED APPLICATION

This application claims the benefit of priority of U.S. provisional application Ser. No. 61/557,180, filed Nov. 8, 2011, the contents of which are herein incorporated by reference.

BACKGROUND OF THE INVENTION

The present invention relates to tool to assist a user in moving items and, more particularly, to hand truck that converts to a panel cars and several other types of carts.

The use of a wheeled cart, by one person, to transport a large variety of different sized and shaped objects, such as long lumber, plywood panels, mattresses, doors, windows, garment bags, large boxes, crates or furniture through doorways or down narrow hallways, requires the use of several different types of wheeled carts, such as a hand truck, a panel cart, a hand cart, a hotel cart or a dolly. For most users, it would be impractical because of the expense and/or storage space required to own three or four carts. A standard hand truck or multi-use cart cannot be converted into a panel cart, most often used at building supply stores, to carry plywood, doors and long lumber. No existing hand truck can be converted into a panel cart as well as a utility cart, a tray-cart, a hotel cart and a lumber cart.

Since plywood panels, mattresses, doors, windows and similar items must be turned on their edge to be transported through doorways, through gate openings or down narrow hallways, a standard hand truck will not work for that purpose. Loading several sheets of plywood on a standard hand truck is only possible by placing the load across the tongue and perpendicular to the direction of travel, making the load too wide to trans port through a standard door. A dolly can haul long objects through a doorway, but it would not work to haul panels, a mattress, or a window on their edge because it has no center support to lean the items against. Laying items flat on a dolly would again make the load too wide. The panel cart has a center support system to allow material to be stood up on its edge and is therefore the only type of cart to perform these functions.

As can be seen, there is a need for a device for transporting different types of items, where the device can be converted from one type of transport to another as needed, depending on the items to be transported.

SUMMARY OF THE INVENTION

In one aspect of the present invention, a convertible cart comprises a main frame having side tubes forming opposite sides of the main frame and a plurality of cross members interconnecting the side tubes, the side tubes separated by a separation distance and at least two of the cross members separated by the same separation distance; a tongue member insertable into both the side tubes and two of the cross members, the tongue member insertable in a first position and a second position, 180 degrees rotated from the first position; a handle member insertable into both the side tubes and two of the cross members via pin-in-tube connectors; pivoting end rails movable between a first position disposed against the main frame and a second position extending at an angle from a plane of the main frame; main wheels disposed on a first end of the main frame; and caster wheels disposed on a second, opposite end of the main frame.

In another aspect of the present invention, a convertible cart comprises a main frame having side tubes forming opposite sides of the main frame and a plurality of cross members interconnecting the side tubes, the side tubes separated by a separation distance and at least two of the cross members separated by the same separation distance; a tongue member insertable into both the side tubes and two of the cross members, the tongue member insertable in a first position and a second position, 180 degrees rotated from the first position; a handle member insertable into both the side tubes and two of the cross members via pin-in-tube connectors; pivoting end rails movable between a first position disposed against the main frame and a second position extending perpendicular from a plane of the main frame; a top rail extendable between ends of the pivoting end rails in the second position; main wheels disposed on a first end of the main frame; and caster wheels disposed on a second, opposite end of the main frame.

These and other features, aspects and advantages of the present invention will become better understood with reference to the following drawings, description and claims.

BRIEF DESCRIPTION OF THE DRAWINGS

FIG. 25 is an exploded top view of the convertible cart of FIG. 1;

FIG. 26 is an exploded side view of the convertible cart of FIG. 1;

FIG. 27 is an end view of the convertible cart of FIG. 1, in a panel cart configuration, carrying sheet material; and FIG. 28 is a side view of the panel cart configuration of FIG. 27.

DETAILED DESCRIPTION OF THE INVENTION

Figure 1:
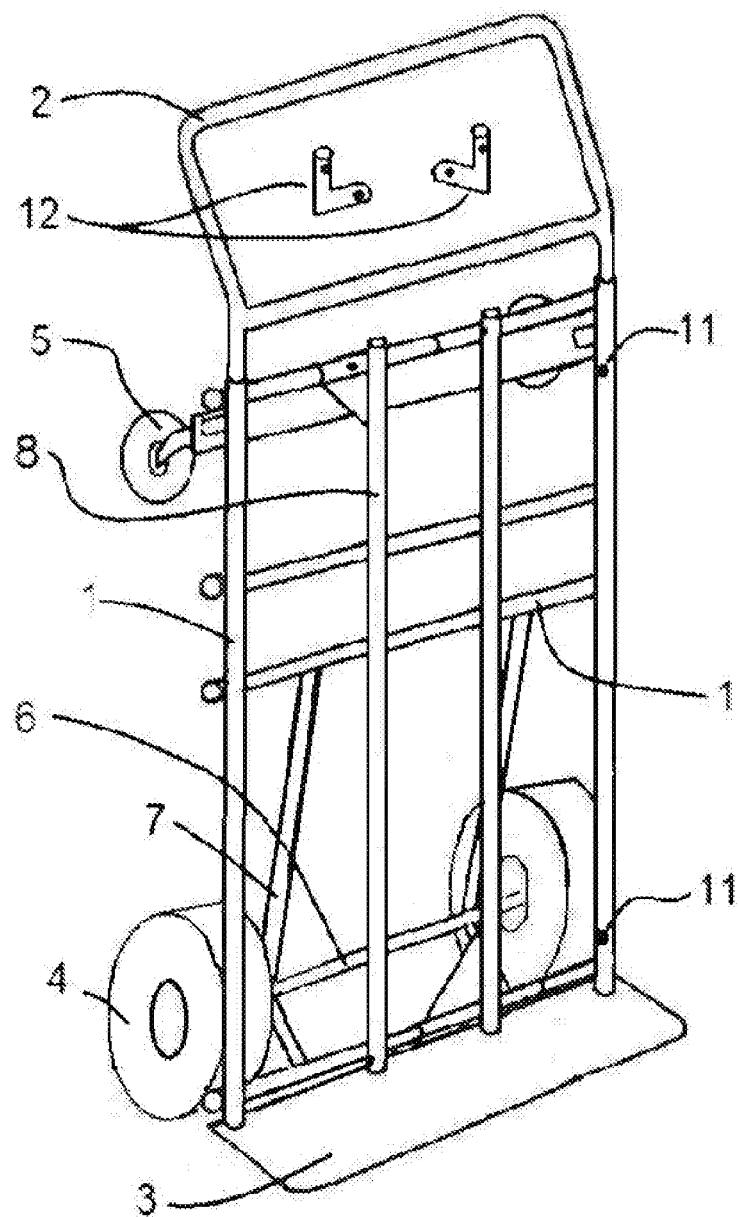
FIG. 1 is a perspective view of a convertible cart, in a hand truck configuration, according to an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a convertible hand cart that can be converted among a panel cart, a tray cart, a hotel cart, a utility cart, a mechanic's cart, a gardener's cart, and the like. The convertible hand cart can be used to transport items through doorways and through narrow halls. In addition to the ability to hall panels, the panel cart configuration has the ability to haul long lumber, doors, windows, mattresses and many other odd shaped items.

The convertible hand cart has a removable, repositionable handle and a removable tongue to provide various configurations.

By repositioning the handle, tongue and rails as needed, a single person can haul boxes, long lumber, groceries, plywood, mattresses, furniture, bags of cement or grass seed, clothes, garment bags, luggage, tables, file cabinets and just about anything that does not exceed a designated weight limit of the cart.

Referring now to the Figures, a main frame 1 can be made of two hollow metal tubes 1A with four cross tubes 1B attached at the ends at 90 degrees. The main frame 1 has the main wheels 4 attached to one end and caster wheels 5 attached to the other end. The axle 6 is attached to the main frame 1 with an axle support bracket 7. The two hollow tubes 1A of the main frame 1 can have an inside diameter from about ¾ to about 2 inches, typically about 1.25 inch. These two hollow tubes 1A can be from about 30 to about 40 inches long, while the cross tubes 1B can be from about 18 to about 26 inches long, typically about 22 inches long. The cross tubes 1B can attach to the two hollow tubes 1A by various methods, such as by welding.

The main wheels 4 can be from about 8 to about 12 inches in diameter, typically about 10 inches in diameter. The caster wheels 5 can be attached to upper corners of the main frame 1 and can be from about 4 to about 6 inches in diameter. In some embodiments, the caster wheels can pivot about 360 degrees.

Figure 16:
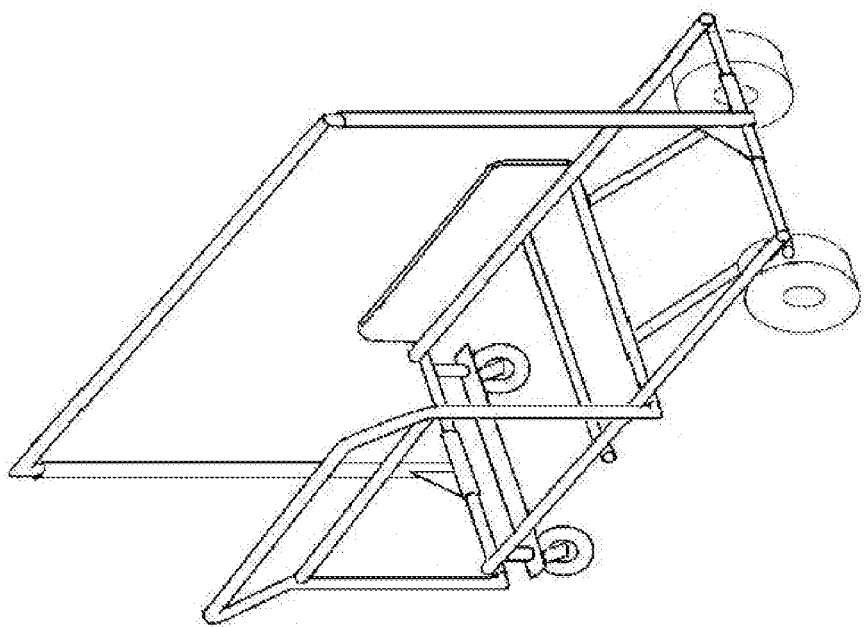
FIG. 16 is a perspective view showing the panel cart of FIG. 15, assembled with the top rail in place.
Figure 15:
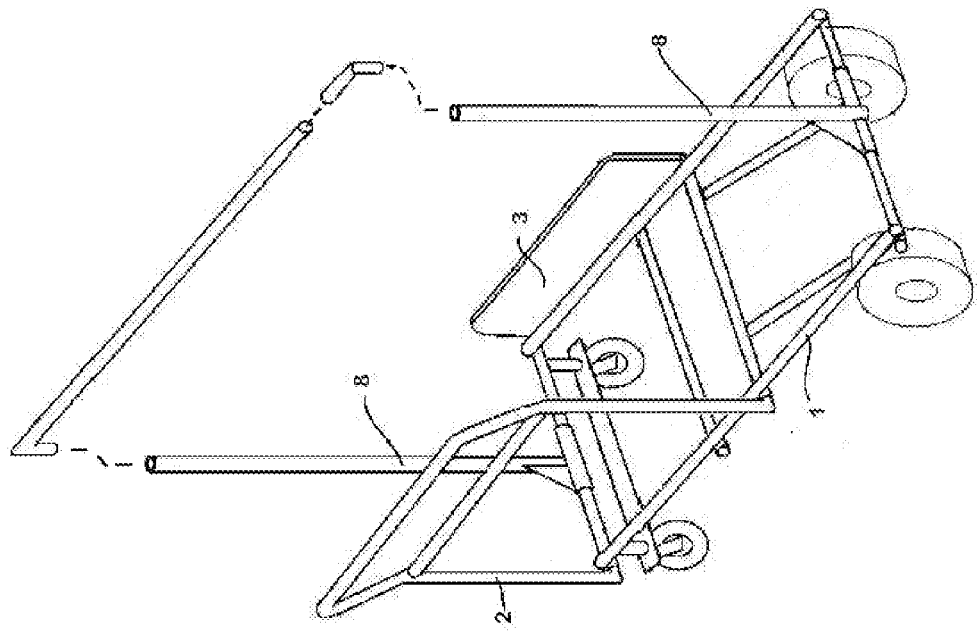
FIG. 15 is a perspective view showing the panel cart of FIG. 14 with a top rail being attached to the pivoting end rails.

The lower end of pivoting end rails 8 can have an inside diameter slightly larger than the outside diameter of the main frame 1 rails that allow them to pivot from the hand-truck position to the panel cart position. The upper ends of the pivoting end rails 8 receive hinged top rails 9 by sliding the tubing into it to convert it from the hand truck position to the panel cart position (see FIGS. 19-22). In some embodiments, as shown in FIGS. 15 and 16, the top rail can be a separate member attached to the ends of the pivoting end rails 8 with angled connectors.

The pivoting end rails 8 can be from about 30 to about 40 inches long. The pivoting end rails 8 can attach to the cross tubes via a pivot that allows the pivoting end rails 8 to pivot about the cross tubes and slide therealong to align the pivoting end rails 8 as shown in FIGS. 13 and 14, and 19 and 20.

A handle 2 and a tongue 3 can be made of tubing with outside diameters slightly smaller than the inside diameter of the main frame 1 tubing, allowing them to slide into the main frame 1 to form the hand truck position. The tongue 3 can be removed, turned 180 degrees and re-inserted to allow the cart to be used to haul longer items that hang over the end. The tongue 3 can also be removed and inserted into the side of the cart to make the panel cart. As an option, the panel cart can make use of the handle 2 by installing it on the side of the cart. This is accomplished by inserting one end of the pin-in-tube connectors 12 into one of the ends of the main frame 1 cross tubes and then sliding the handle 2 onto the other end of the pin-in-tube connectors 12. The pivoting end rail 8, located over the caster wheel, can be used as a handle by attaching one of the pin-in-tube connectors 12 into the open end, thus converting into the "wagon" mode, which can be used in particular for hauling in grass, dirt or sandy soil.

Figure 2:
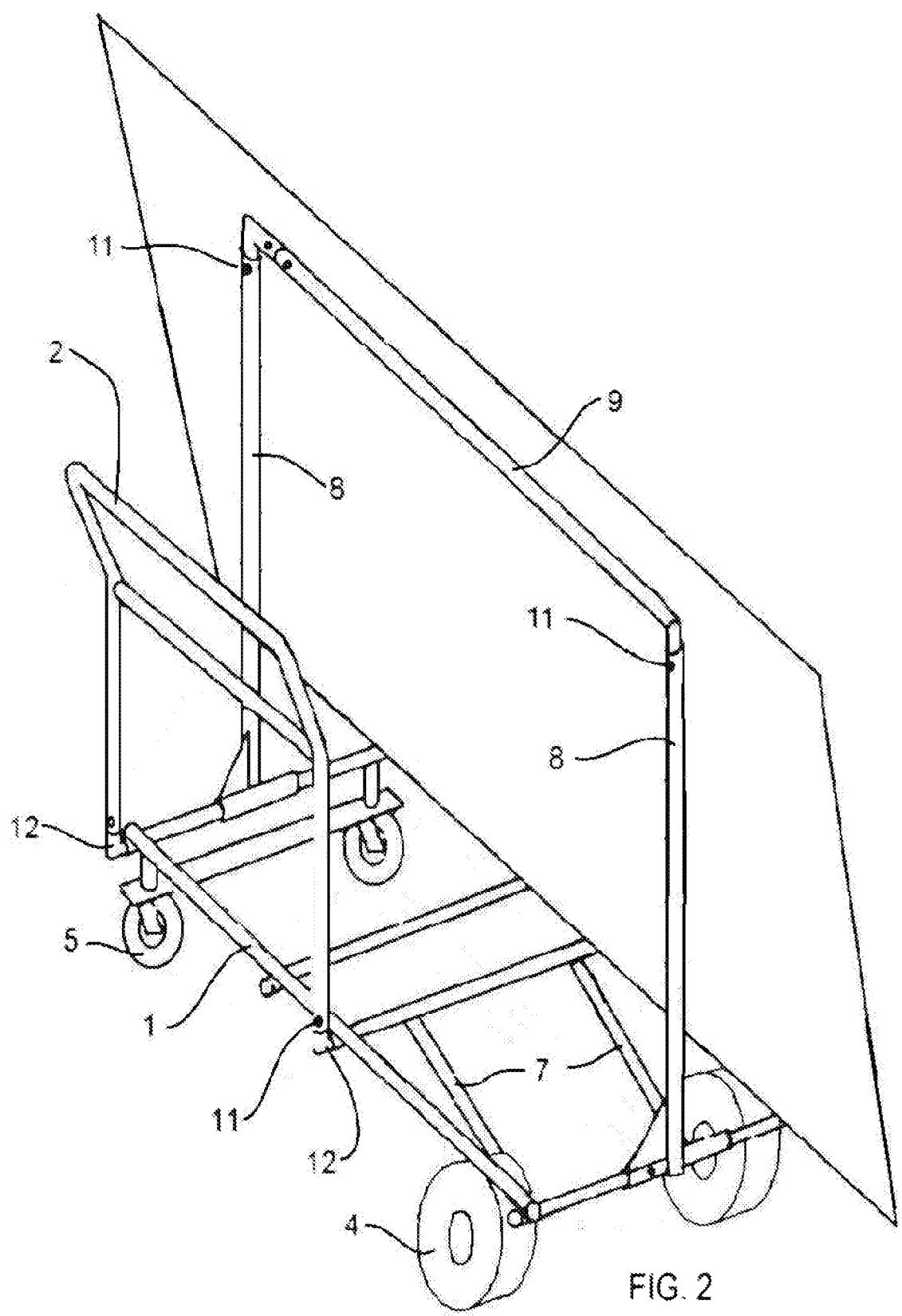
FIG. 2 is a perspective view of the convertible cart of FIG. 1 in a panel cart configuration.
Figure 4:
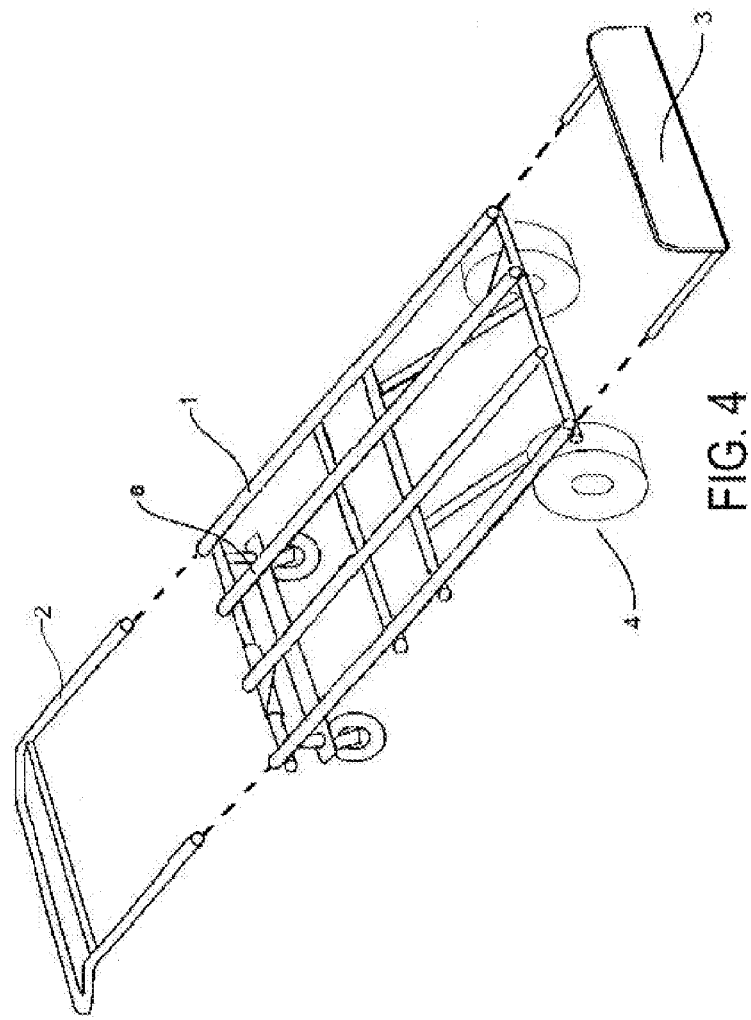
FIG. 4 is a perspective view of the hand truck of FIG. 3, showing removal of its handle and tongue.
Figure 3:
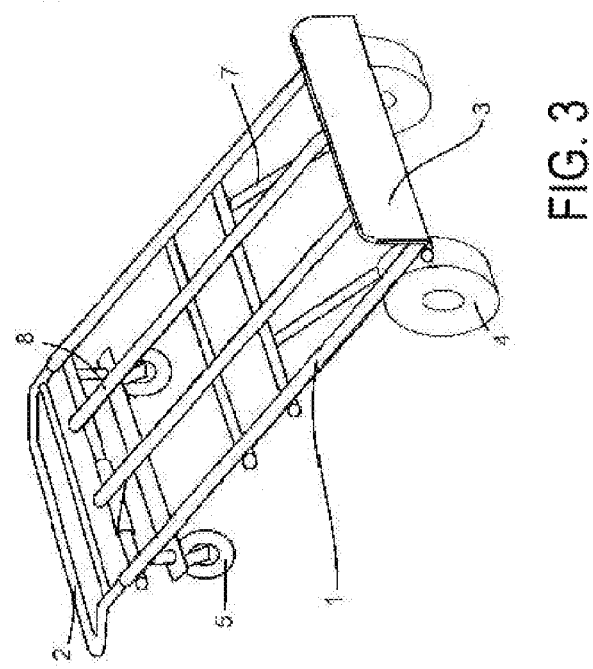
FIG. 3 is a perspective view of the hand truck of FIG. 1 disposed in a horizontal position.
Figure 6:
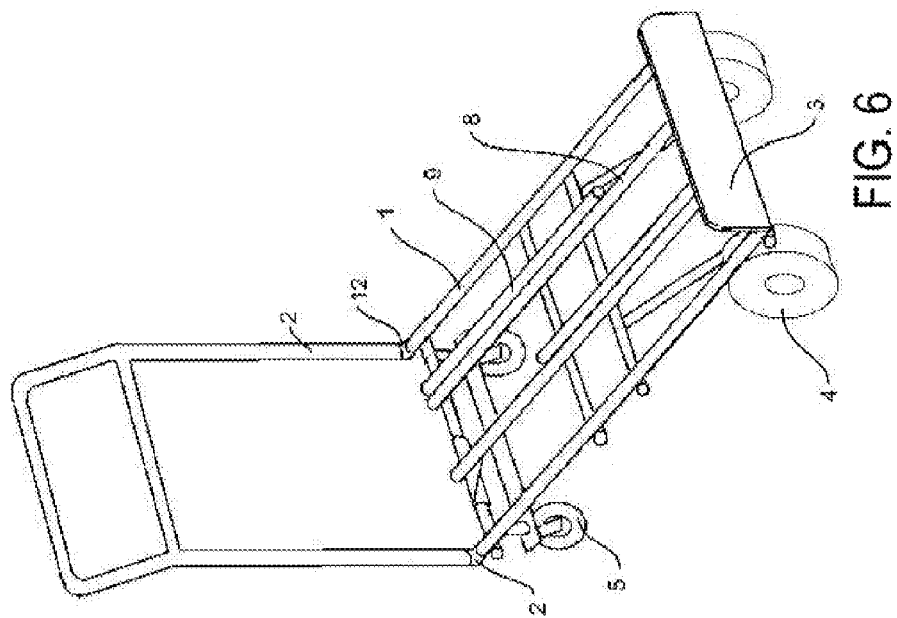
FIG. 6 is a perspective view of the hand truck of FIG. 5, completing the first alternate configuration of a dolly.
Figure 5:
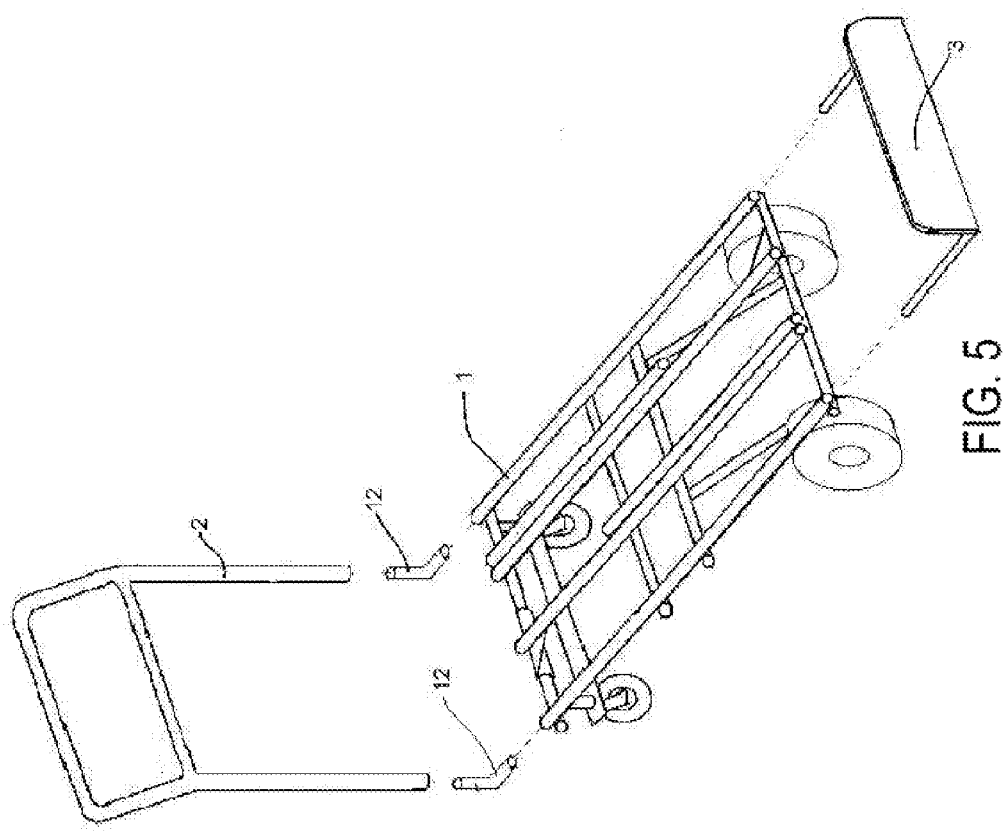
FIG. 5 is a perspective view of the hand truck of FIG. 4, showing the connection of the handle and tongue in a first alternate configuration.
Figure 10:
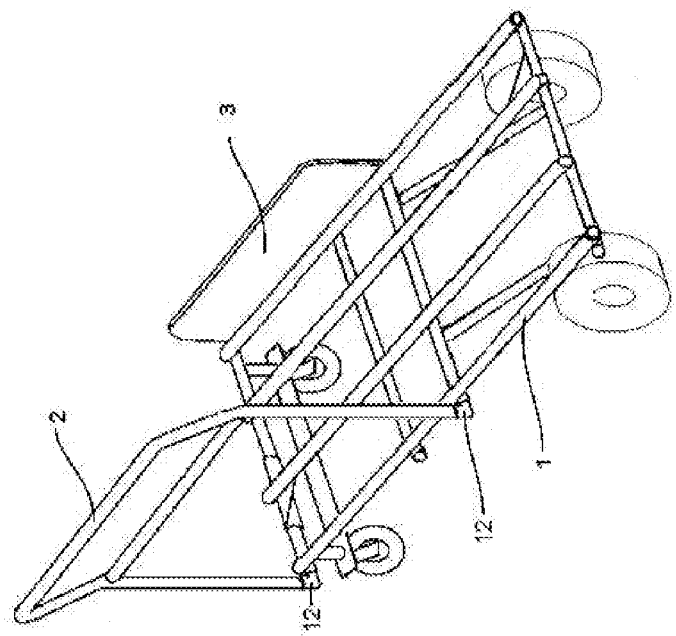
FIG. 10 is a perspective view showing the first embodiment of the panel cart of FIG. 9, assembled
Figure 9:
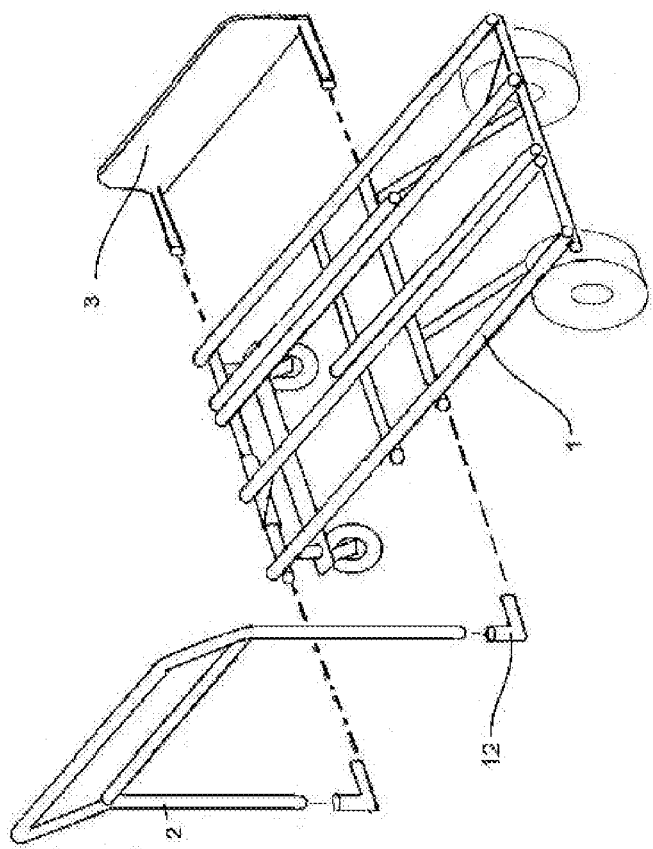
FIG. 9 is a perspective view showing insertion of the handle and tongue into the base member to form a first embodiment of a panel cart.
Figure 12:
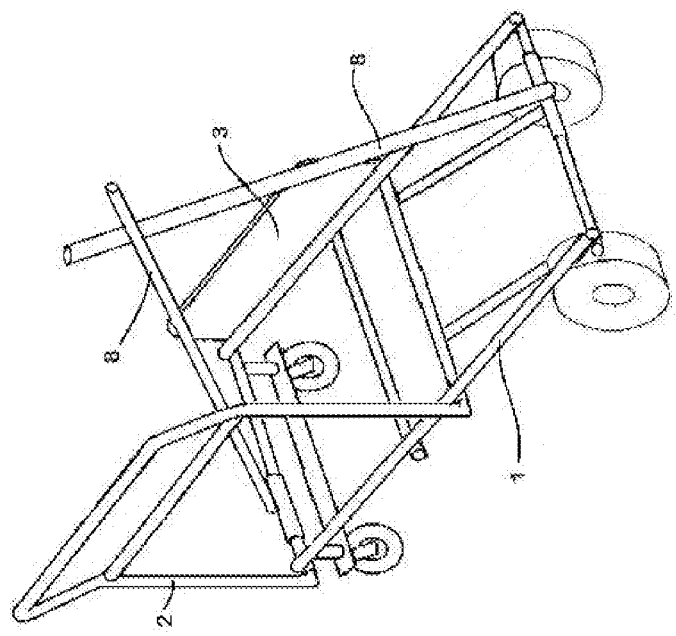
FIG. 12 is a perspective view showing the panel cart of FIG. 11 with pivoting end rails being moved into an upright position.
Figure 11:
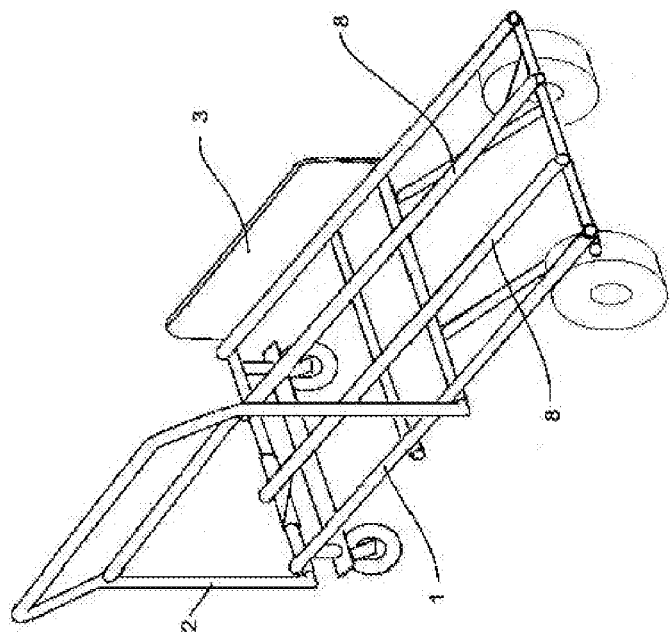
FIG. 11 is a perspective view showing the panel cart of FIG. 10.
Figure 14:
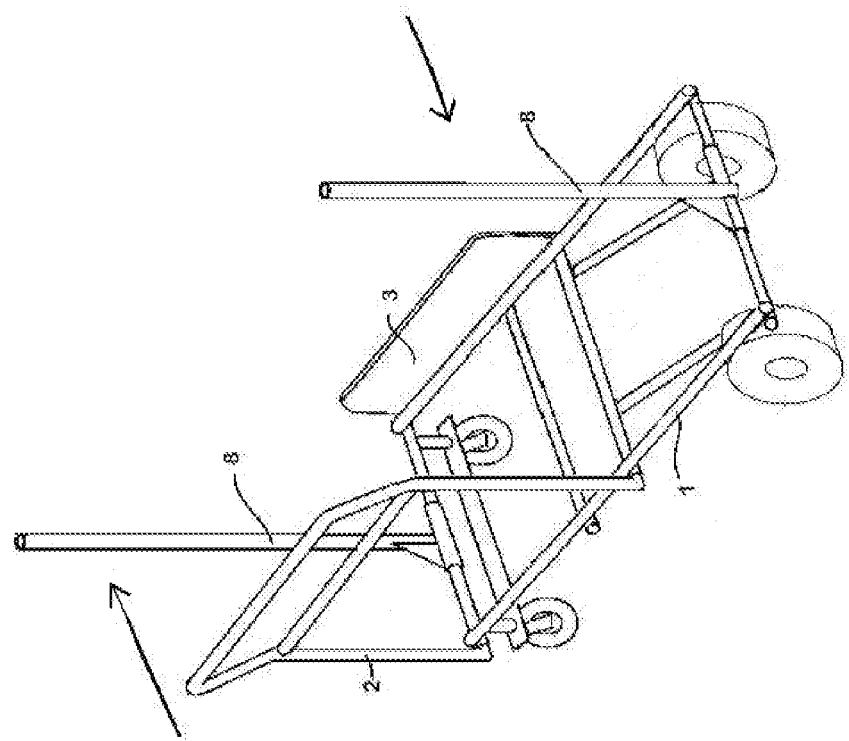
FIG. 14 is a perspective view showing the panel cart of FIG. 13 with the pivoting end rails moved in alignment with each other.
Figure 13:
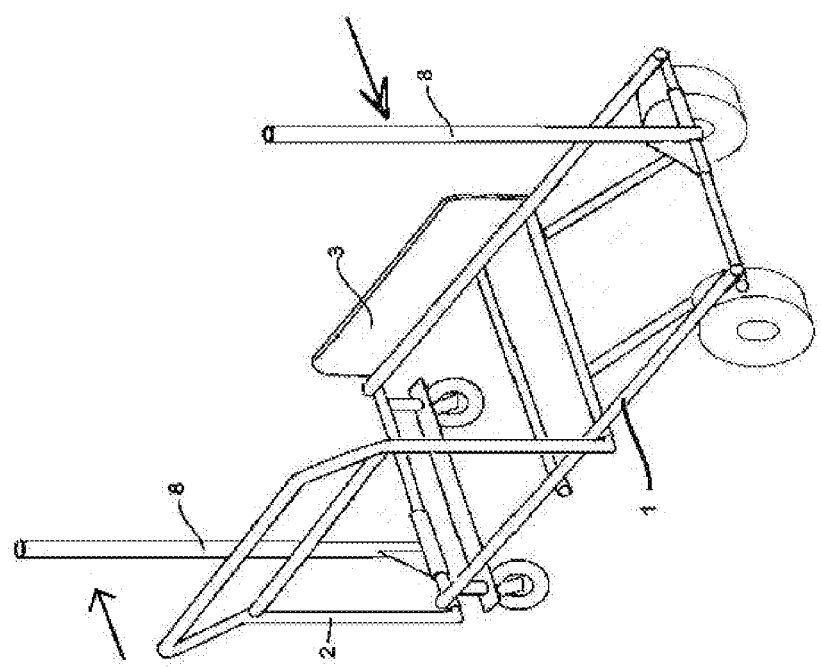
FIG. 13 is a perspective view showing the panel cart of FIG. 12 with the pivoting end rails moved in the upright position.
Figure 18:
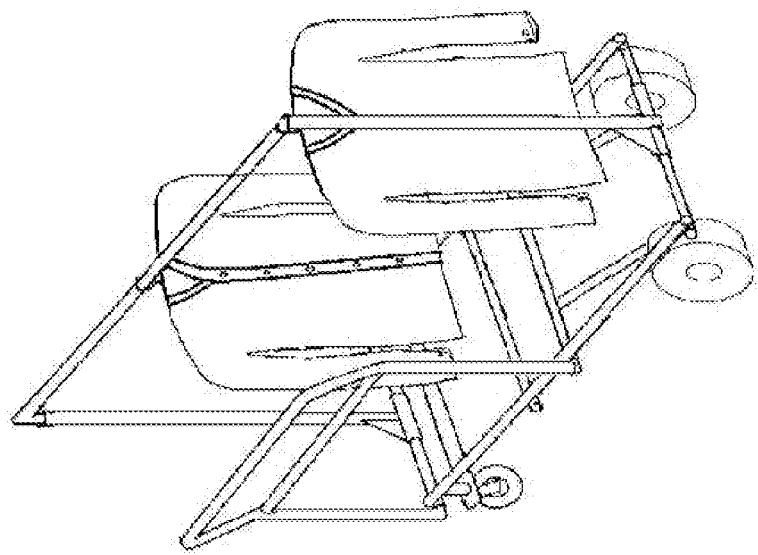
FIG. 18 is a perspective view showing the panel cart of FIG. 16, in use as a laundry cart.
Figure 17:
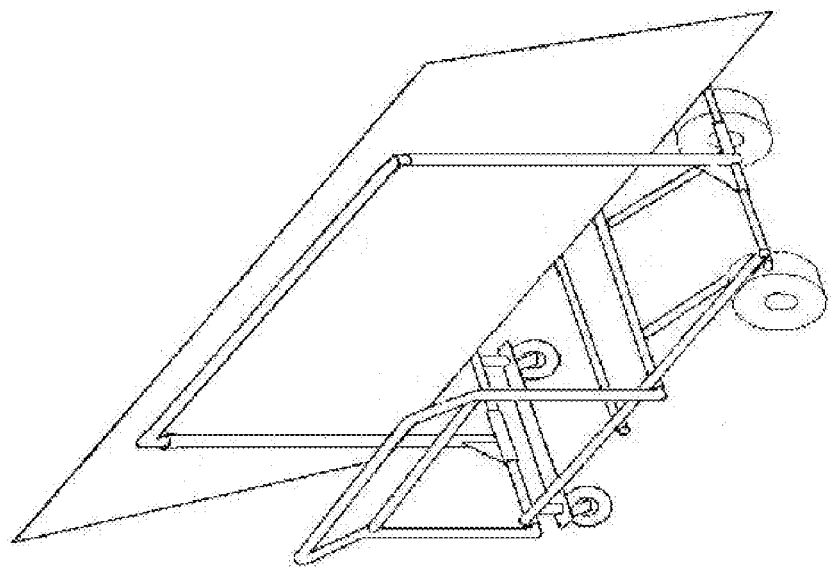
FIG. 17 is a perspective view showing the panel cart of FIG. 16, in use with a piece of sheet material.
Figure 20:
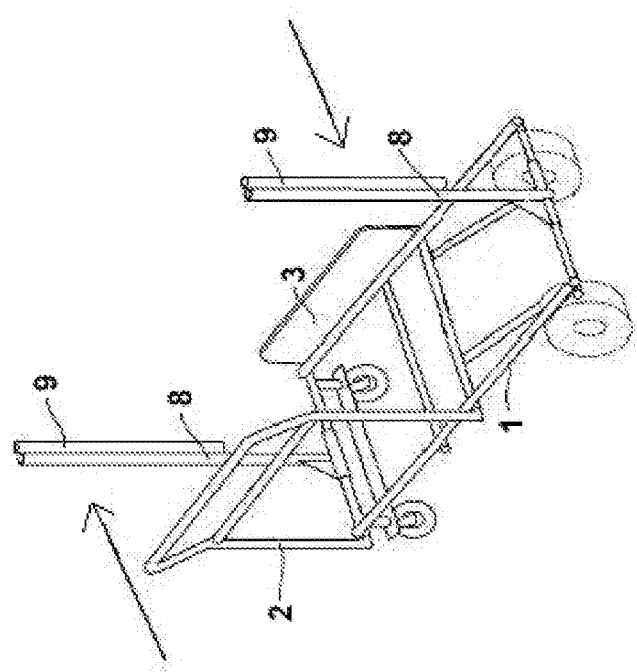
FIG. 20 is a perspective view showing the panel cart of FIG. 19 with the pivoting end rails being moved in alignment with each other.
Figure 19:
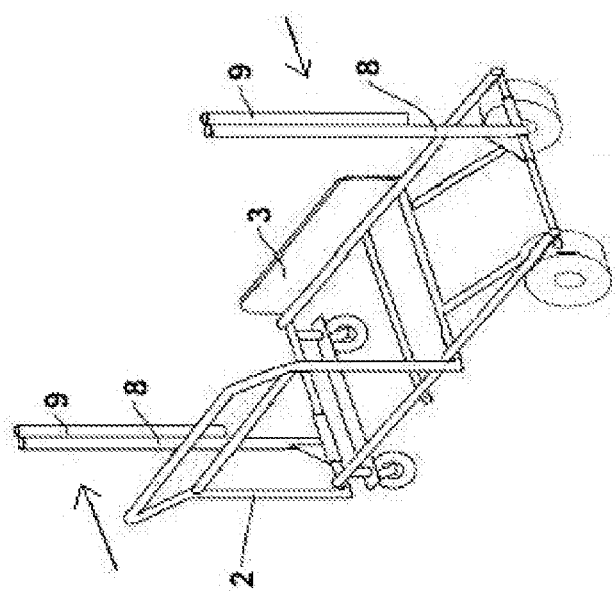
FIG. 19 is a perspective view of a panel cart having an integral hinged top rail according to an exemplary embodiment of the present invention.
Figure 22:
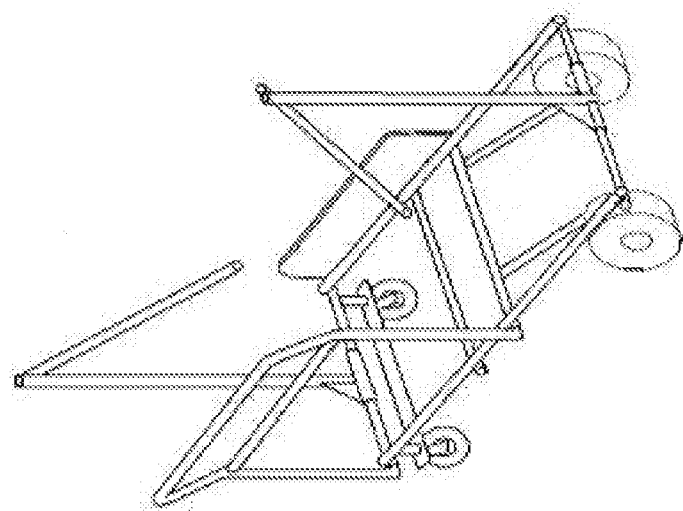
FIG. 22 is a perspective view showing the panel cart of FIG. 19 assembled with the integral top rail in place.
Figure 21:
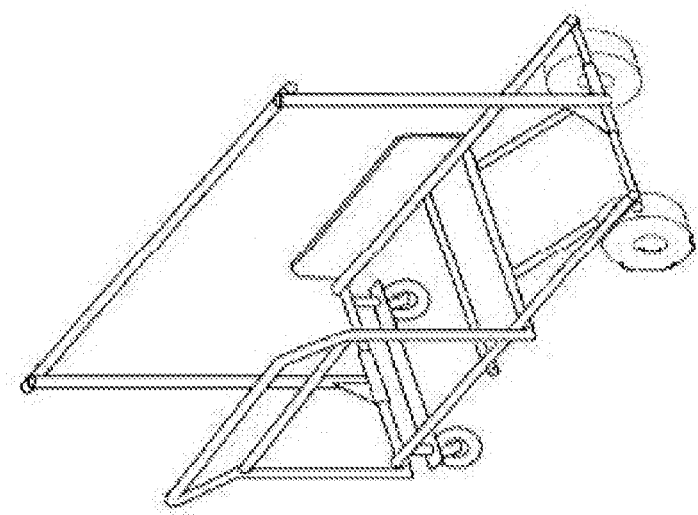
FIG. 21 is a perspective view showing the panel cart of FIG. 19 with the integral hinged top rail being moved to create a top rail.

To create the panel cart (FIG. 17), lumber cart (FIG. 11) or hotel cart (FIG. 18), the handle is connected to the side of the cart by means of the pin-in-tube connectors 12 and the tongue 3 is connected to the opposite side of the cart (FIGS. 9 and 10). To create the center support of the panel cart (FIG. 2), the lower end of the pivoting end rails 8 have an inside diameter slightly larger than the outside diameter of the main frame 1 rails so that they can be rotated to an upright position and slid to the center of the main frame (FIGS. 12, 13 and 14). The pivoting end rails 8 and the hinged top rails 9 are connected at the ends by sliding into each other (FIG. 15) or by pivoting on the ends of the pivoting end rails 8 (FIG. 21). The two are then locked together using spring pins, thus creating the panel cart.

Figure 8:
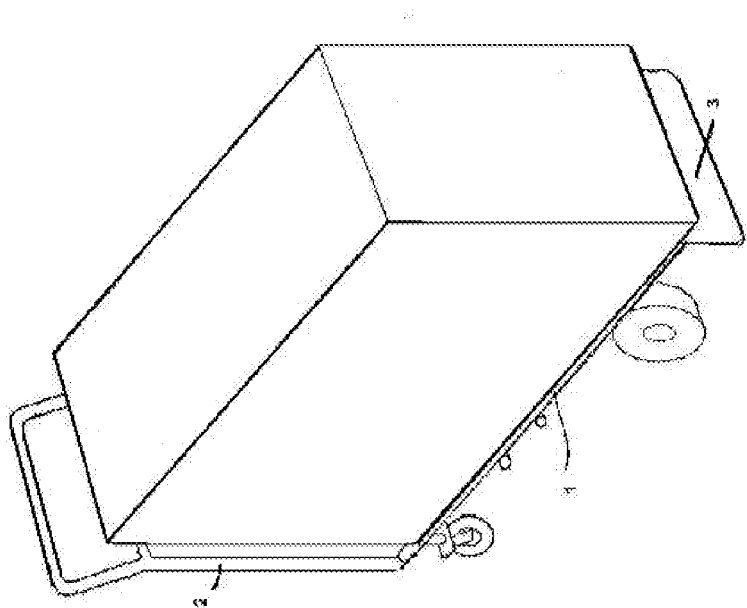
FIG. 8 is a perspective view of the dolly of FIG. 7, in use.
Figure 7:
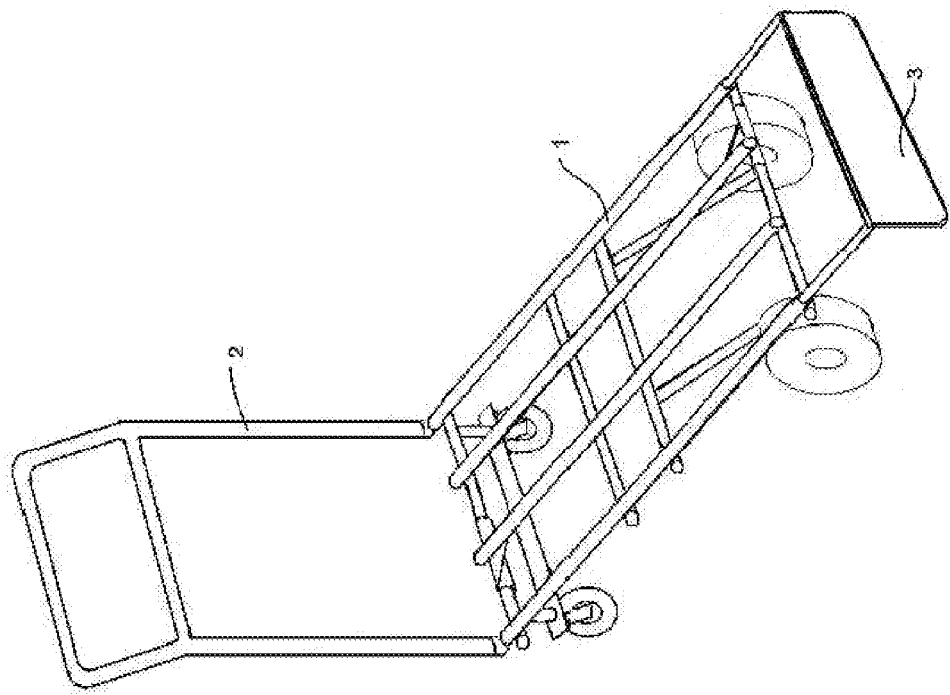
FIG. 7 is a perspective view of the hand truck of FIG. 6, with the tongue turned around to provide a second dolly configuration.

To create a utility cart capable of hauling oversized crates or boxes (FIGS. 7 and 8), the tongue 3 can be removed, rotated 180 degrees and partially re-inserted to provide a flat extension to the main frame 1.

Figure 24:
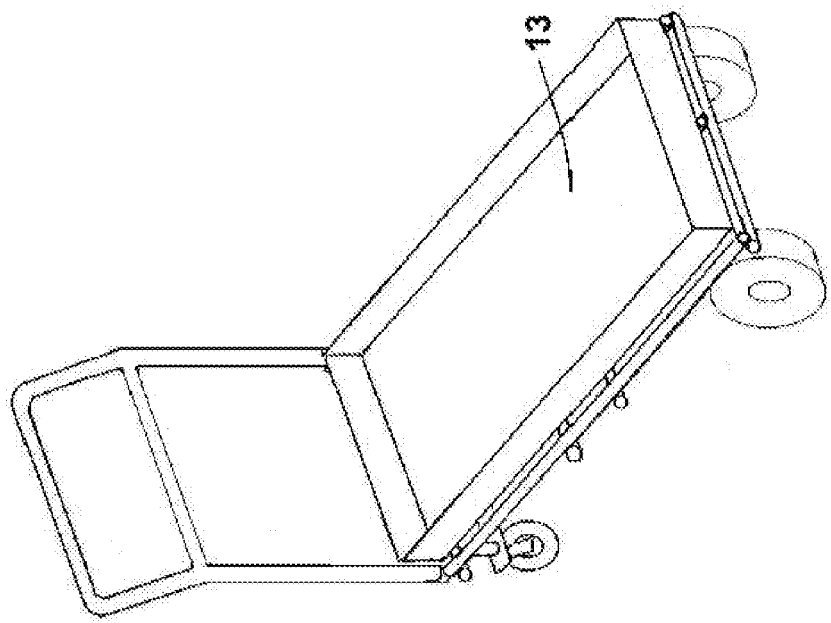
FIG. 24 is a perspective view showing a tray cart with a tray attached in a lower tray configuration.
Figure 23:
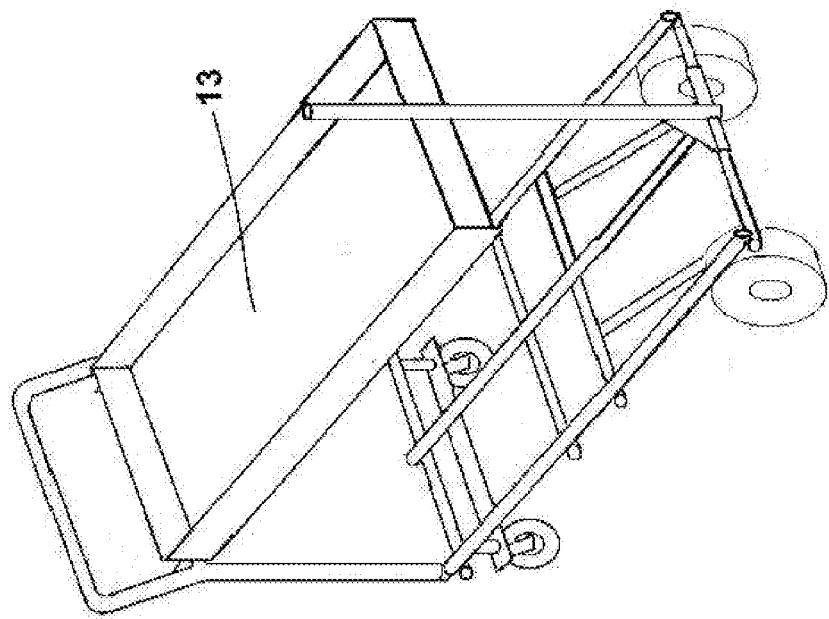
FIG. 23 is a perspective view showing a tray cart with a tray attached in an upper tray configuration.

To create a tray cart (FIGS. 23 and 24), the optional tray 13 can be attached to the main frame 1 for a low platform or it can be attached to the handle 2 and one of the pivoting end rails 8 for a raised platform.

The handle and tongue can be used on either side of the cart for a slight advantage for a right or left handed person or for ease of loading or unloading.

The convertible hand truck of the present invention is designed to haul many different size and shaped objects by repositioning its handle, rails and tongue. This is possible because the handle and tongue have a standard spacing and size that will allow them to slide into the end of the cart or, by using the pin-in-tube connectors, attach perpendicular to the cart. The components are locked in position by the use of spring pins installed and protruding from the smaller of the tubing components. When the pin from the spring pin is aligned with a pre-drilled hole in the larger tubing, the two components are locked together.

It should be understood, of course, that the foregoing relates to exemplary embodiments of the invention and that modifications may be made without departing from the spirit and scope of the invention as set forth in the following claims.

What is claimed is:

1. A convertible cart comprising:
a main frame having side tubes forming opposite sides of the main frame and a plurality of cross members interconnecting the side tubes, the side tubes separated along a side tube longitudinal axis by a separation distance and at least two of the cross members separated along a cross member longitudinal axis by the same separation distance;
a tongue member insertable into either of both the side tubes or two of the cross members, the tongue member insertable in a first position and a second position, 180 degrees rotated from the first position;
a handle member insertable into either of both the side tubes or two of the cross members via pin-in-tube connectors;
pivoting end rails movable between a first position disposed against the main frame and a second position extending at an angle from a plane of the main frame;
main wheels disposed on a first end of the main frame; and
caster wheels disposed on a second, opposite end of the main frame.

2. The convertible cart of claim 1, wherein the pivoting end rails extend perpendicular from the plane of the main frame in the second position.

3. The convertible cart of claim 1, further comprising a top rail interconnecting ends of the pivoting end rails.

4. The convertible cart of claim 1, further comprising a top rail interconnecting ends of the pivoting end rails via pin-in-tube connectors.

5. The convertible cart of claim 1, further comprising a top rail pivoting from ends of the pivoting end rails.

6. The convertible cart of claim 1, wherein the main wheels are disposed on an axis parallel to the cross members and the caster wheels are operable to swivel about 360 degrees.

7. The convertible cart of claim 1, further comprising a tray disposable in a first position on top of the main frame and in a second, elevated position between the handle and one of the pivoting end rails.

8. A convertible cart comprising:
a main frame having side tubes forming opposite sides of the main frame and a plurality of cross members interconnecting the side tubes, the side tubes separated along a side tube longitudinal axis by a separation distance and at least two of the cross members separated along a cross member longitudinal axis by the same separation distance;
a tongue member insertable into either of both the side tubes or two of the cross members, the tongue member insertable in a first position and a second position, 180 degrees rotated from the first position;
a handle member insertable into either of both the side tubes or two of the cross members via pin-in-tube connectors;
pivoting end rails movable between a first position disposed against the main frame and a second position extending perpendicular from a plane of the main frame;
a top rail extendable between ends of the pivoting end rails in the second position;
main wheels disposed on a first end of the main frame; and
caster wheels disposed on a second, opposite end of the main frame.

9. The convertible cart of claim 8, wherein the top rail interconnects ends of the pivoting end rails via pin-in-tube connectors.

10. The convertible cart of claim 8, wherein the top rail pivots from ends of the pivoting end rails.

11. The convertible cart of claim 8, wherein the main wheels are disposed on an axis parallel to the cross members and the caster wheels are operable to swivel about 360 degrees.

12. The convertible cart of claim 8, further comprising a tray disposable in a first position on top of the main frame and in a second, elevated position between the handle and one of the pivoting end rails.

* * * * *